April 26, 1966  J. P. BUNN  3,247,931
CARGO PALLET WITH TELESCOPING SKIDS
Filed Oct. 11, 1963  3 Sheets-Sheet 1

INVENTOR.
JOHN P. BUNN
BY
Agent

April 26, 1966  J. P. BUNN  3,247,931
CARGO PALLET WITH TELESCOPING SKIDS
Filed Oct. 11, 1963  3 Sheets-Sheet 2
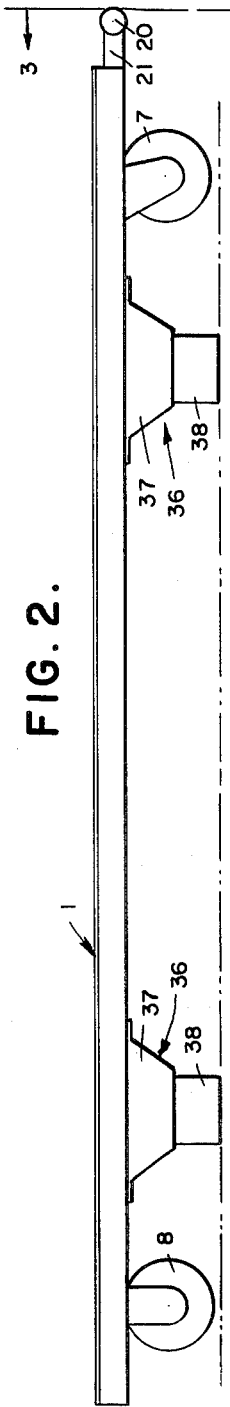
FIG. 2.
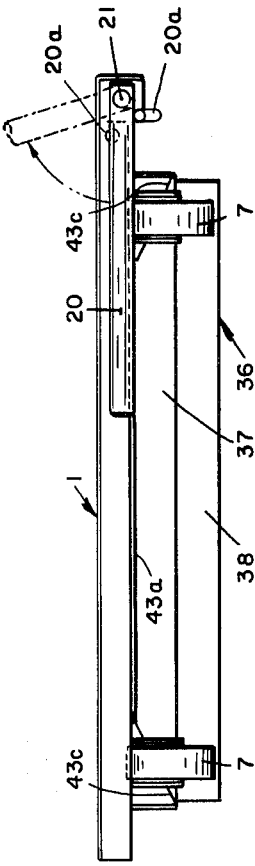
FIG. 3.
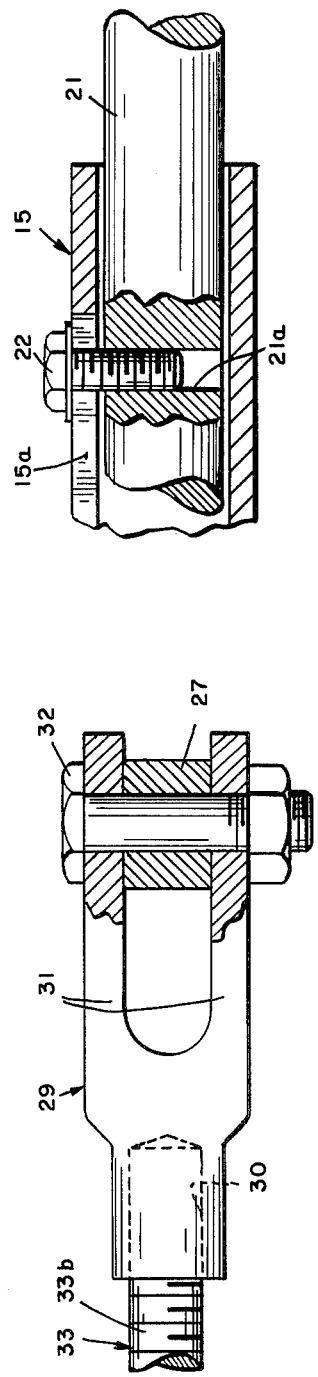
FIG. 6.
FIG. 7.
INVENTOR.
JOHN P. BUNN
BY
Agent April 26, 1966  J. P. BUNN  3,247,931
CARGO PALLET WITH TELESCOPING SKIDS
Filed Oct. 11, 1963  3 Sheets-Sheet 3

INVENTOR.
JOHN P. BUNN
BY
Agent 3,247,931
CARGO PALLET WITH TELESCOPING SKIDS
John P. Bunn, Atlanta, Ga., assignor to Lockheed
Aircraft Corporation, Burbank, Calif.
Filed Oct. 11, 1963, Ser. No. 315,599
9 Claims. (Cl. 188—5)

This invention relates to a cargo pallet, and more particularly to a cargo pallet having casters engaging the floor for facilitating movement of the pallet and telescoping skids for supporting the cargo pallet during transportation.

In the transportation of goods from one place to another by motor freight or otherwise, it has been found economical to load a cargo pallet with goods to be transported in a warehouse and then to load such cargo pallet onto a carrier for transportation of the goods to a point of use. Such method of freight goods handling, it will be appreciated, substantially reduces the down time for the carrier during loading and unloading operations. Although many advantages are obtained by the use of cargo pallets, those not having casters must be moved about by fork lift or the like and those having casters require removal or locking in place of the pallet when stored or loaded in a carrier. Some efforts have been made in the past to provide freight handling trucks with both casters and elevating prongs, as exemplified by the United States Letters Patent 2,020,386 to Ulrich, patented November 12, 1935. Such devices, however, apparently have not found their way into the market place because of a variety of reasons such as excessive weight and complexity. To eliminate the disadvantages and limitations of such prior art devices, this invention provides a cargo pallet having casters which may be engaged with the floor for facilitating movement of the cargo pallet in combination with elongate telescoping skids for engagement with the floor for elevation of the cargo pallet casters from the floor whereby the cargo pallet may be rigidly supported on the skids during transportation or storage of the cargo pallet.

Accordingly, it is an object of this invention to provide a light weight cargo pallet having casters and elongate telescoping skids alternately engageable with the floor for supporting the pallet.

Another object of this invention is to provide a cargo pallet having casters and spaced-apart telescoping skids which are actuated into engagement with the floor for supporting the cargo pallet by toggle elevating links actuated by a common torque tube.

A further object of this invention is to provide a cargo pallet having casters and hollow telescoping skids having toggle elevating links contained therein for their protection from the elements, which links are actuated by a common actuator.

A still further object of this invention is to provide a cargo pallet having casters and spaced-apart telescoping skids actuated by a common torque tube having a handle thereon for rotating the torque tube, which handle is capable of movement into a stowed position when the cargo skids are extended for minimizing the space taken up by the cargo pallet during transportation.

Other objects and advantages will become apparent from the following description taken in connection with the accompanying drawings in which:

FIGURE 2 is a side elevational view of the cargo pallet of FIGURE 1;

FIGURE 3 is an end elevational view of the cargo pallet taken along line 3—3 of FIGURE 2;

FIGURE 6 is a fragmentary view showing a detail of the handle assembly for the telescoping skids; and FIGURE 7 is a fragmentary view showing the detail of the interconnection of the torque tube and connecting link for the telescoping skids.

Generally stated, this invention comprises a lightweight cargo pallet having casters and spaced-apart elongate skids operatively extendable into engagement with the floor for mounting the cargo pallet on the skids with the casters disengaged from the floor. The skids are of the telescoping type and each contains therein two spaced-apart pairs of toggle elevating links actuated by a rod connected to a torque tube, which in turn is rotatably actuated by a stowable handle at one end thereof.

Figure 1:
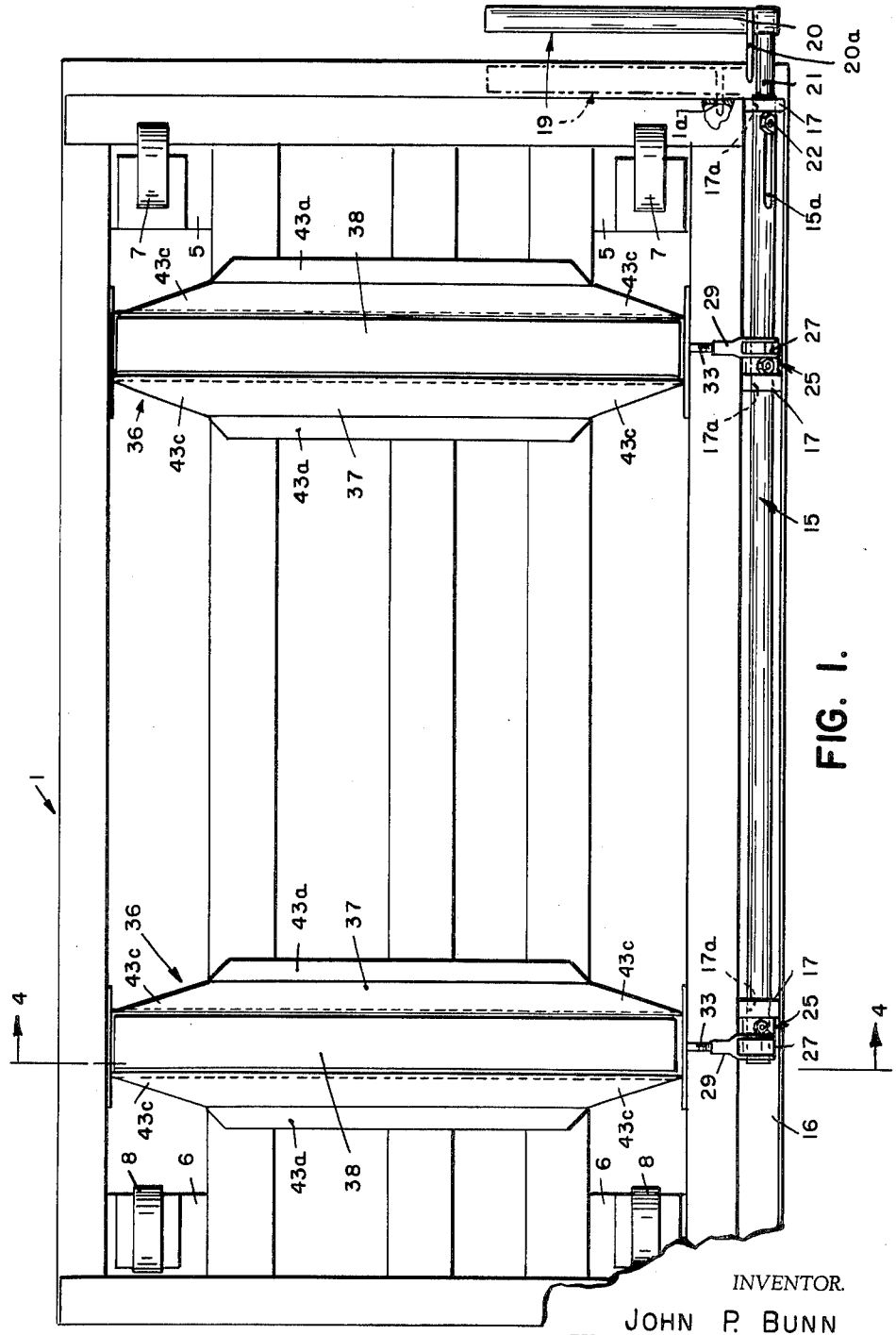
FIGURE 1 is a bottom plan view of a cargo pallet embodiment of this invention.

More specifically, there is shown in FIGURES 1, 2 and 3, a cargo pallet 1 having mounting plates 5 and 6 secured thereto which, respectively, dependingly mount casters 7, which are pivotal only about a vertical axis, and non-pivotal casters 8. A torque tube 15 is mounted at one side of the cargo pallet preferably beneath angle beam 16 in through holes 17a of plate bearings 17, although the torque tube 15 could as easily be mounted along or inwardly of the side edge of the pallet on other and different bearings.

Torque tube 15 has an elongate axial slot 15a adjacent its one end and transverse bores 18 proximate the two bearings 17 adjacent telescoping skids 36. For rotating the torque tube, there is provided a handle assembly 19 comprising a handle 20 having an offset pin 20a and a rod 21 which extend perpendicularly from one end of the handle. The rod 21 has a threaded bore 21a therein, FIGURE 6, and is slidably mounted within the end of the torque tube 15 such that bolt 22 may be mounted through slot 15a in the torque tube 15 into threaded engagement with bore 21a in the rod 21. The bolt 22 interacts with the sidewalls of slot 15a for rotation of the torque tube 15, permits retraction of the handle 20 to a stowed position beneath the top of the cargo pallet, permits extension of the handle to an operative position, and permits partial retraction of the handle in the up position for engagement of pin 20a with bore 1a formed in the side of the cargo pallet 1 to lock the skids in the up position.

Figure 4:
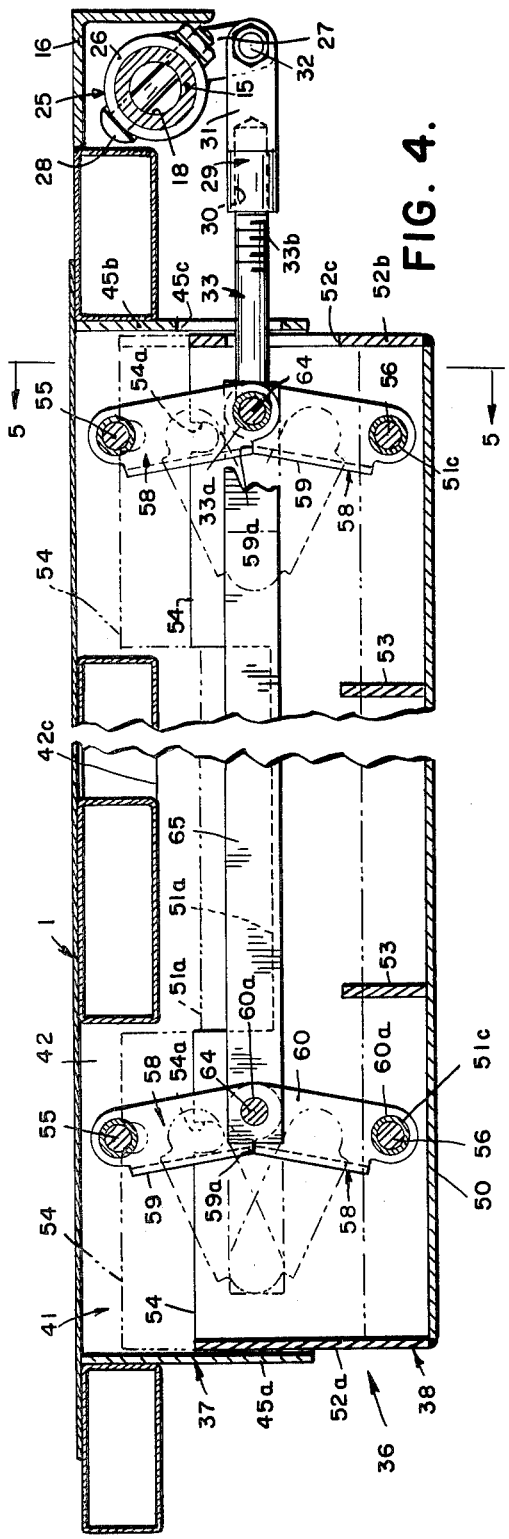
FIGURE 4 is a cross-sectional view showing the detail of telescoping skid construction taken along line 4—4 of FIGURE 1.

Identical bell crank assemblies 25, best seen in FIGURE 4, each comprising a tubular collar 26 having a crank arm 27 extending therefrom are secured to the torque tube 15 by bolt assemblies 28 proximate the two bearings 17 adjacent telescoping skids 36. A yoke 29, one of which is shown in detail in FIGURE 7, provided with a threaded axial bore 30 and a bifurcated end portion 31 is pivotally connected by its bifurcated end portion to each of the crank arms 27 by a bolt assembly 32. An actuating connecting rod 33 having a transverse bore 33a through its head end is threadably engaged by its threaded shaft end 33b within axial bore 30 of each yoke 29. Identical elongate telescoping skids 36, best seen in FIGURES 4 and 5, each including the top section 37 and a bottom section 38, are mounted on the underside of the cargo pallet 1 in axial alignment with the rods 33.

Each top section 37 comprises a pair of parallel spaced-apart sidewall members 41 dependingly secured to the underside of the cargo pallet 1. The opposite ends of the sidewall members are closed by end plates 45a and 45b, the latter of which has an opening 45c therethrough. Each sidewall member 41 is preferably made of a single sheet of metal which comprises a main body portion 42 having transverse mounting holes 42a formed in its opposite ends, which have sleeves or collars 42b welded therein, and a support portion 43 which includes a mounting flange 43a. The support portions 43 are formed by bending the support portion along the line 43b at an angle of approximately 30 degrees with respect to the main body portion 42, and the mounting flange 43a in the opposite direction at a complementary angle. Also, the support portions 43 are cut along the diagonal lines 43c at their opposite ends, see FIGURES 1 and 3, to permit access to the mounting holes 42a. Each sidewall member 41 thus formed is secured to the underside of cargo pallet 1 by welding the side edge of the main body portion 42 and the flange 43a of the support portion to the undersurface of the cargo pallet which they abut. In the case shown wherein the cargo pallet is formed of spaced-apart box beams, the center section of the main body portion 42 is provided with a cutout 42c such that the side edge of the main body center portion is in alignment with the flange 43a and the opposite ends of the main body portion extend upwardly into the opening between the box beams. This construction provides a maximum surface area for connection of the sidewall member 41 to the cargo pallet and additionally places the mounting holes 42a a maximum distance above the ground for decreasing the silhouette of the telescoping skids.

Figure 5:
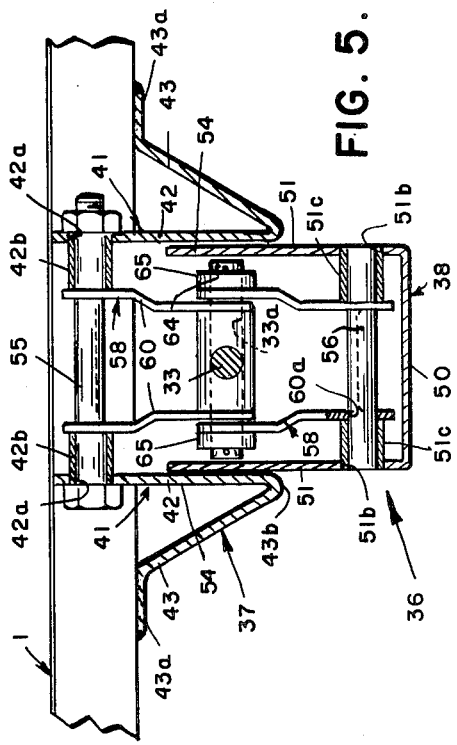
FIGURE 5 is a cross-sectional view showing further detail of the telescoping skid construction taken along line 5—5 of FIGURE 4.

Bottom section 38 of each skid 36 comprises a bottom ground engaging portion 50; sidewall portions 51 extending perpendicularly therefrom; and end walls 52a and 52b interconnecting the sidewall portions and bottom portion, the end wall 52b having an opening 52c therethrough. For stiffening the bottom section 38 of each skid, stiffeners or bulkheads 53 are secured in spaced-apart relation along the skid bottom section interconnecting the bottom portion 50 and sidewall portions 51. The sidewall portions 51 have rectangular extensions 54 on the opposite ends of their top side edges 51a which are provided with aligned slots 54a intersecting their top side edges 51a. Additionally, axially aligned transverse through holes 51b, FIGURE 5, are formed in the sidewall portions 51 proximate the bottom portion 50 in vertical alignment with the slots 54a, and bearing collars 51c are preferably welded in the holes 51b formed in the sidewall portions 51. For mounting the bottom skid section 38 in operative relation with respect to the top skid section 37, shaft assemblies 55 are mounted in the mounting holes 42a and bearing collars 42b of the top skid section, and shaft assemblies 56 are mounted in the holes 51b and bearing collar 51c formed in the sidewall portions 51 of the bottom skid sections. Identical channel-shaped toggle links 58 are pivotally mounted on the shafts 55 and 56. Each toggle link 58 comprises a base member 59 and spaced-apart flanges 60 projecting perpendicularly therefrom which are outset at their one end so that the opposite ends of a pair of cooperatingly engaged toggle links 58 interfit with the main body portions thereof in axial alignment. Also, the flanges 60 extend beyond the ends 59a, which also serve as bearing seats, of the base member 59 and have aligned bores 60a through their oppositely extending ends for pivotally mounting the toggle links 58 from the shafts 55 and 56. The toggle links 58 are centered on shafts 55 and 56 by bearing collars 42b and 51c respectively.

The bottom skid section 38 has outside dimensions slightly smaller than the inside dimensions of the top skid section 37 and is slidably and guidably telescoping received within the upper skid section. For operatively connecting the top skid section 37 to the bottom skid section 38, the toggle links 58 thereof are pivotally connected together by mounting a shaft assembly 64 in bores 60a in the mating ends of the flanges 60 of the toggle links. To connect the pairs of toggle links 58 together, connecting rods 65 are connected between the opposite ends of the pairs of shafts 64, and to connect the telescoping skids 36 to their operate linkage for actuation thereby, the rods 33 are pivotally connected to an adjacent pair of toggle links 58 by insertion of the pin 64 through the transverse bore 33a of each rod 33.

In operation, with the bottom sections 38 of the skids 36 engaging the floor and the casters 7 and 8 above the floor, the handle 20 will be in the down position and stowed beneath the top surface of the cargo pallets. In this position of the handle 20, the rods 33 will be moved to the right as seen in FIGURE 4, and the pairs of toggle links 58 will be over-the-center to the right with the adjacent seats 59a of their bases 59 in abutting seated engagement. It should be particularly noted that the surface areas of seats 59a are quite large so as to provide a firm bearing and support area for the toggle links. To elevate the bottom skid sections 38, the handle 20 is extended and then rotated in the counterclockwise direction to move the rods 33 to the left, as seen in FIGURE 4, for positioning the toggle links 58 over-the-center to the left. Upon elevation of the bottom skid sections 38, the pin 20a projecting from handle 20 is engaged with the hole 1a in the cargo pallet to lock the skids in the up position. In this regard, it should be noted that when the toggle links 58 are over-the-center to the left, the skids bottom sections 38 are slightly elevated above the floor and that positive locking of the skids in the up position is only necessary when greater clearance between the skids and floor is desired. Also, it should be particularly noted that the support portions 43 of the top skid sections 37 reinforce the top sections against lateral overturning moments, and that the extension 54 on the sidewalls of the bottom skid section 38 provide an enlarged surface area for the transfer of forces between the bottom and top skid sections. In this manner, applicant provides for the economical protection against collapse of the skids 36 under acceleration forces which may be encountered in transport, as when a truck driver hits the brakes too fast, or a railroad car is bumped in a switching operation, for example. Also, the bottom sections 38 of the skids, being elongate and having flat bottoms, provide a maximum bearing surface for the skids thereby eliminating the need for tying down of the cargo pallet in the carrier. Further, the mounting of the toggle links 58 within the telescoping skids 36 protects them from the elements, and the connection of the operate linkages of each of the skids to the torque tube 16 provides a simple mechanism having an excellent mechanical advantage whereby the skids may be elevated or retracted from one end of the cargo pallet by hand or foot operation of handle 20.

It will be seen from the above that the cargo pallet of this invention provides for the economical transportation of goods in that it is simple in construction and light in weight, may be rolled about within a storage area and onto a carrier without special equipment being required, and may be placed on firm skid supports within a storage area or in a carrier simply by extension of the skids. The cargo pallet, in addition, is reinforced for protection against acceleration forces which tend to collapse the skids and has a stowable handle for minimizing the space taken up by the cargo pallet when the skids are extended.

While a particular embodiment of the invention has been illustrated and described, it will be obvious to those skilled in the art that various changes and modifications may be made without departing from the invention and it is intended to cover in the appended claims all such modi-

What is claimed is:
1. A cargo pallet comprising:
   a body;
   casters dependingly secured to said body;
   at least two parallel spaced-apart skids each including a top section dependingly secured to said body and a bottom section cooperating with said top section;
   skid elevating means connected between each said top and bottom skid sections;
   linkage means operatively connected to each said skid elevating means;
   a torque tube rotatably mounted at one end of said skids, said torque tube connected to each said linkage means for operation of said skid elevating means to extend and retract said bottom skid sections relative to said top skid sections for respectively engaging said skids and casters with the floor upon rotation thereof wherein said body is supportable on the floor by the skids with all casters off the floor or supported by all the casters;
   handle means for rotating said torque tube to effect operation of said skid elevating means;
   and means for locking said skid bottom section in its extended position.

2. The cargo pallet of claim 1 wherein means are provided for locking said skid bottom section in its retracted position.

3. The cargo pallet of claim 1 wherein said handle means is extendable from a stowed position beneath the cargo pallet for retraction of said skid bottom section.

4. A cargo pallet comprising:
   a body;
   casters dependingly secured to said body;
   spaced-apart skids, each including a top section dependingly secured to said body and a bottom section cooperating with said top section;
   skid elevating means within each of said skids operative to extend and retract said bottom section relative to said top section for respectively engaging said skids with the floor and removing all casters therefrom and engaging said casters with the floor by retracting the skids therefrom;
   means for operating said skid elevating means simultaneously.

5. A cargo pallet comprising:
   a body;
   casters dependingly secured to said body;
   spaced-apart skids, each including a top section dependingly secured to said body and a bottom section cooperating with said top section;
   skid elevating means within each of said skids operative to extend and retract said bottom section relative to said top section for respectively engaging said skids with the floor and removing all casters therefrom and engaging said casters with the floor by retracting the skids therefrom;
   linkage means operatively connected to said skid elevating means;
   and a torque tube mounted at one end of said skids beneath the upper surface of said body,
       said torque tube connected to said linkage means for operation of said skid elevating means simultaneously upon rotation thereof.

6. A cargo pallet comprising:
   a body;
   casters dependingly secured to said body;
   spaced-apart skids, each including a top section dependingly secured to said body and a bottom section cooperating with said top section;
   skid elevating means within each of said skids operative to extend and retract said bottom section relative to said top section for respectively engaging said skids with the floor and removing all casters therefrom and engaging said casters with the floor by retracting the skids therefrom;
   linkage means operatively connected to said skid elevating means;
   a torque tube mounted at one end of said skids beneath the upper surface of said body,
       said torque tube connected to said linkage means for operation of said skid elevating means simultaneously upon rotation thereof;
   and handle means axially-slidably and non-rotatably engaged with one end of said torque tube,
       said handle means axially-slidably extendable from a stowed position beneath the cargo pallet for retraction of said skid bottom section.

7. In a cargo pallet, a telescoping skid top section comprising:
   spaced-apart planar main body sidewall portions secured at one end to the underside of the cargo pallet;
   end wall portions connected between the ends of said main body sidewall portions forming a rectangular tubular opening therewith;
   and a lateral support portion secured at one end to the free end of each of said main body portions so as to form an acute angle with respect to said main body portions and secured at the other end to the underside of the cargo pallet.

8. In a cargo pallet telescoping skid assembly,
   a top skid section including spaced-apart main body portions secured at one end to the underside of the cargo pallet, end wall portions connected between the ends of said main body portion forming a rectangular tubular opening therewith, a lateral support section secured at one end to the free end of each of said main body portions at an angle with respect to said main body portions and secured at the other end to the underside of said cargo pallet;
   a bottom skid section including a bottom wall portion, sidewall portions extending from said bottom wall portion, and end wall portions interconnecting said sidewall portions,
       said bottom skid section mounted in sliding cooperating engagement with said top skid section;
   and elevating means mounted on said cargo pallet for extending and retracting said bottom skid section relative to said top skid section.

9. A cargo pallet comprising a body:
   casters dependingly secured to said body;
   a pair of parallel spaced-apart skids each having a slidably interfitting top section and bottom section,
       said top skid sections each including spaced-apart main body portions secured at one end to the underside of said cargo pallet, end portions closing the opposite ends of said main body portion, and a lateral support section secured between the bottom free end of said main body portion and the underside of said cargo pallet,
       and each said bottom skid sections including a bottom portion, sidewall portions, and end portions interconnecting said sidewall portions;
   toggle skid elevating means mounted within each said skid and pivotally interconnected between said bottom and top skid sections;
   an opening through one pair of adjacent end portions of said top and bottom skid sections at one end of each said skids;
   linkage means extending through said openings and connected to said toggle skid elevating means;
   a torque tube rotatably mounted adjacent the ends of said skids which have said openings therein;
   crank arms connecting said torque tube to said linkage means;
   and handle means axially-slidably and non-rotatably engaged with one end of said torque tube for simultaneous extension and retraction of said bottom skid sections with respect to said top skid sections.

References Cited by the Examiner

UNITED STATES PATENTS

| | | | |
|---|---|---|---|
| 862,414 | 8/1907 | Roberts | 188—5 |
| 1,029,301 | 6/1912 | Kertesz | 188—5 |
| 1,197,190 | 9/1916 | Dunn et al. | |
| 2,020,386 | 11/1935 | Ulrich | 188—5 X |
| 2,154,952 | 4/1939 | Mahlock. | |
| 2,185,073 | 12/1939 | Chamberlain. | |
| 2,239,301 | 4/1941 | Papst. | |
| 2,739,784 | 3/1956 | Thompson et al. | |
| 3,216,531 | 11/1965 | Hutchinson. | |

FOREIGN PATENTS 244,558   4/1947   Switzerland.

DUANE A. REGER, *Primary Examiner.*

ARTHUR L. LA POINT, *Examiner.*